(12) United States Patent
Scudder et al.

(10) Patent No.: US 9,444,984 B2
(45) Date of Patent: Sep. 13, 2016

(54) DEVICE HAVING A CAMERA UNIT

(71) Applicant: Huf Hulsbeck & Furst GmbH & Co. KG, Velbert (DE)

(72) Inventors: Austen Kolar Scudder, Verona, WI (US); Alex Scott Walters, Bulter, WI (US); Ulrike Fichert, Wuppertal (DE); Shannon Christian Bartlett, Cedarburg, WI (US); Richard Heinz Jungmann, Richfield, WI (US)

(73) Assignee: Huf Hulsbeck & Furst GmbH & Co. KG, Velbert (DE)

( * ) Notice: Subject to any disclaimer, the term of this patent is extended or adjusted under 35 U.S.C. 154(b) by 651 days.

(21) Appl. No.: 13/845,451

(22) Filed: Mar. 18, 2013

(65) Prior Publication Data

US 2013/0293713 A1   Nov. 7, 2013

Related U.S. Application Data

(63) Continuation of application No. 13/703,465, filed as application No. PCT/EP2011/058948 on May 31, 2011.

(60) Provisional application No. 61/354,151, filed on Jun. 11, 2010.

(51) Int. Cl.
*H04N 5/225* (2006.01)
*B60R 11/04* (2006.01)
(Continued)

(52) U.S. Cl.
CPC ............. *H04N 5/2253* (2013.01); *B60R 11/04* (2013.01); *G03B 11/00* (2013.01); *G03B 17/04* (2013.01); *G03B 29/00* (2013.01); *H04N 7/18* (2013.01); *B60R 2011/0094* (2013.01)

(58) Field of Classification Search
CPC .............................. B60R 11/04; H04N 5/2253
USPC .......................................................... 348/148
See application file for complete search history.

(56) References Cited

U.S. PATENT DOCUMENTS 6,382,847 B1    5/2002  Takada
6,819,231 B2   11/2004  Berberich et al.
(Continued)

FOREIGN PATENT DOCUMENTS

CN     1897603 A1    1/2007
DE   10234483 A1    2/2004
(Continued)

OTHER PUBLICATIONS

Office Action from Chinese Patent Application No. 2013101199770 dated Nov. 19, 2014.
(Continued)

*Primary Examiner* — Tung Vo
*Assistant Examiner* — Rowina Cattungal
(74) *Attorney, Agent, or Firm* — Calfee, Halter & Griswold LLP (57) ABSTRACT

The invention relates to a device, comprising a camera unit, which is used to record images of the exterior area of a motor vehicle, and a cover element, which can be moved from a closed position to an open position by means of a drive, wherein the camera unit is behind the cover element and inaccessible from outside in the closed position of the cover element and images can be recorded in the open position of the cover element. For this purpose, the cover element has an outer surface facing away from the camera unit, and the drive interacts with a mechanism in such a way that the outer surface is always in the exterior area of the motor vehicle in each position of the cover element during the movement of the cover element between the closed position and the open position.

13 Claims, 8 Drawing Sheets

(51) Int. Cl.
*G03B 11/00* (2006.01)
*G03B 17/04* (2006.01)
*G03B 29/00* (2006.01)
*H04N 7/18* (2006.01)
*B60R 11/00* (2006.01)

(56) References Cited

U.S. PATENT DOCUMENTS

| | | | |
|---|---|---|---|
| 8,118,501 | B2 | 2/2012 | Buschmann |
| 2003/0146831 | A1* | 8/2003 | Berberich ............... B60R 11/04 340/461 |
| 2004/0130622 | A1 | 7/2004 | Lang et al. |
| 2006/0256459 | A1* | 11/2006 | Izabel ..................... B60R 11/04 359/872 |
| 2007/0013555 | A1* | 1/2007 | Sung ..................... H04N 5/2251 340/937 |
| 2008/0079848 | A1 | 4/2008 | Kung et al. |
| 2009/0231430 | A1* | 9/2009 | Buschmann ......... B60Q 1/0023 348/148 |
| 2009/0309971 | A1 | 12/2009 | Schuetz |

FOREIGN PATENT DOCUMENTS

| | | |
|---|---|---|
| DE | 202005017430 | 9/2006 |
| DE | 202005017430 U1 | 10/2006 |
| DE | 102006048373 A1 | 4/2008 |
| DE | 102009039962 | 4/2010 |
| DE | 102009008283 | 8/2010 |
| EP | 1003068 | 5/2000 |
| EP | 1332923 | 8/2003 |
| EP | 1332923 A2 | 8/2003 |
| JP | 1332923 A2 | 8/2003 |
| JP | 4139527 B2 | 8/2008 |
| TW | 200815894 A | 4/2008 |
| WO | 2008022717 | 2/2008 |
| WO | 2010091657 A1 | 8/2010 |
| WO | 2011086132 A1 | 7/2011 |

OTHER PUBLICATIONS

International Search Report for corresponding International Application No. PCT/EP2011/058948 mailed Dec. 16, 2011.
Response to Office Action from U.S. Appl. No. 13/703,465 dated Nov. 23, 2015.
Office Action from U.S. Appl. No. 13/845,436 dated Oct. 9, 2015.
Office Action from European Application No. 117230565 dated Oct. 21, 2015.
International Search Report and Written Opinion from International Application No. PCT/EP2011/058948 dated Jan. 2, 2012.
Office Action from U.S. Appl. No. 13/703,465 dated Jun. 25, 2015.
First Office Action from CN Application No. 201310119979X dated Jan. 7, 2015.

* cited by examiner

DEVICE HAVING A CAMERA UNIT

The invention relates to a device, comprising a camera unit which is used to record images of the exterior area of a motor vehicle, and a cover element which can be moved from a closed position to an open position by means of a drive, wherein the camera unit is behind the cover element and inaccessible from outside in the closed position of the cover element and images can be recorded in the open position of the cover element.

This application is a Continuation Application of Ser. No. 13/703,465 filed Dec. 11, 2012. The application claims benefit of national phase of International Application No. PCT/EP2011/058948 filed May 31, 2011 and published in the German language. This application claims the benefit of U.S. Provisional Application No. 61/354,151 filed Jun. 11, 2010, which is hereby incorporated by reference.

In addition, the invention relates to a process for attaching said device having a camera unit and also to a device as an assembly unit having a camera unit. Furthermore, the invention relates to a device with an assembly element and a cover that together form a housing, specifically for a camera unit, wherein at least one component, specifically a component of a drive, is arranged inside the housing.

EP 1 003 068 B1 discloses a camera unit for recording images of the exterior area of a motor vehicle. Here, a cover element is provided that can be moved by means of a drive from an open position to a closed position and vice versa. A disadvantage of such a closing mechanism for moving the cover element to the desired position is that it requires much space. It was also found that much effort was required to install such a device having a camera unit.

One of the problems to be solved by this invention is to create a space-saving and compact device of the type referred to above.

According to the invention, provisions are made for the cover element to have an outer surface facing away from the camera unit and for the drive to interact with such a mechanism so that, during the movement of the cover element between the closed position and the open position, the outer surface is always in the exterior area of the motor vehicle in any position of the cover element. Since, during the movement to the desired position, the outer surface of the cover element remains always outside the motor vehicle body in the exterior area of the motor vehicle and is not pivoted into the body of the motor vehicle as in prior art, it is possible to create a very compact and space-saving device. The drive with the mechanism for moving the cover element requires little space and little installation room inside the motor vehicle. It may be of special advantage to install such a device in the rear area of pickup trucks that offer little installation space for the installation of such a device. Of course, such a device according to the invention can be used in all types of motor vehicles. This invention offers the additional advantage that the outer surface of the cover element may carry lettering, a logo, a brand, or a drawing that is always visible in any position of the cover element for a person positioned outside the motor vehicle. This means that an advertising effect can be achieved by the cover element.

An additional problem to be solved by the invention is to simplify the installation of a device having a camera unit on a body part of the motor vehicle.

The invention provides for the device to be implemented as an assembly unit that can be attached to a body part of a motor vehicle and comprises an assembly element that carries the following elements: a camera unit that serves for recording images of the exterior area of a motor vehicle, a drive that is connected with and acts on a cover element, with the cover element being movable by means of the drive between a closed position and an open position, where the camera unit is located, inaccessible from the outside, behind the cover element when the cover element is in closed position, and where the recording of images can be performed when the cover element is in open position, and where the assembly element comprises at least one attachment means with which the assembly element can be attached on the outside on a body part of the motor vehicle. As an assembly unit, the device is prefabricated in such a way that all essential elements such as camera unit, drive including cover element, are already attached to the assembly unit. In addition, the assembly element comprises the required attachment means for attaching the assembly unit on the outside of a body part of the motor vehicle. For this purpose, the body part comprises, advantageously, attachment counter parts that interact with the attachment means of the assembly element.

An additional problem to be solved by the invention is to create an installation process for a device having a camera unit with which the assembly person is able to attach the device having a camera unit to the motor vehicle with the least possible effort.

According to the invention, the process for attaching a device to a body part of a motor vehicle provides for an assembly element that carries the following elements: a camera unit that serves for recording images of the exterior area of a motor vehicle, a drive that is connected with and acts on a cover element, with the cover element being movable by means of the drive between a closed position and an open position, where the camera unit is located, inaccessible from the outside, behind the cover element when the cover element is in closed position, and where the recording of images can be performed when the cover element is in open position, and where the assembly element comprises at least one attachment means with which the assembly element can be attached from the outside on the body part of the motor vehicle. Said process for attaching the device according to the invention has the special advantage that the assembly person is able to attach the assembly element to the relevant body part of the motor vehicle from the outside only, without having to perform additional assembly steps on the inside of the motor vehicle. In summary, it should be emphasized that only one process step is necessary for attaching the device according to the invention, i.e. placing the assembly element on the body part of the motor vehicle, with the attachment means on the assembly element ensuring simultaneously that the device having a camera unit according to the invention is held reliably on the body part. The assembly element may be prefabricated with all elements, such as camera unit, drive including the cover element so that the assembly person only needs to attach the prefabricated assembly element at the defined location on the motor vehicle. It is possible, of course, to provide for a fully automatic attachment of the prefabricated assembly element on the body part of the motor vehicle, for example by means of a robot or a machine operating in a similar way.

Furthermore, the invention addresses the additional problem of creating a device with a housing, specifically for a camera unit and/or an actuation element that permits a simple assembly, specifically an assembly without tools. In addition, this device should comprise as few components as possible.

According to the invention, the invention provides for the support of the component in the assembly element, on the one hand, and in the cover, on the other hand. This component may consist of a movable or rotatable component or of an immovable or rigid component that is arranged inside the housing. Specifically, these components form a component of a drive that is required for a cover element of the camera unit. The assembly of the device according to the invention is accomplished by placing the components in their support in the assembly element and by then fixing the components in their places by joining the assembly element and the cover without an additional step. For this purpose, part of the support for components under discussion is also provided in the cover, just like in the assembly element. This makes it possible to eliminate additional support or attachment elements inside the housing for fixing the components in place in the housing. In addition, this makes possible a simple assembly, if necessary without tools, of the device with its components. Specifically, this makes it possible to eliminate an assembly tool because the components can simply be placed by hand in the associated supports in the assembly element.

In a possible embodiment of the invention, the mechanism may comprise at least one guide contour and at least one swivel arm, with the cover element being attached with its rear side on the guide contour and on the swivel arm, where specifically the cover element comprises on its rear side a first connection element and/or a second connection element, with at least one connection element being movably supported on the guide contour and/or the swivel arm.

It is also possible to design the mechanism in such a way that, during the movement of the cover element from the closed position to the open position in a first movement phase, the cover element moves away from the motor vehicle and simultaneously swivels around at least one axis, and that, in a second movement phase, the cover element is pulled towards the motor vehicle and simultaneously swivels back around at least one axis. Here, it is possible for the first and the second movement phase to back-overlap. Both movement phases may also take place sequentially. In the closed position, the cover element is located directly on the body of the motor vehicle. Advantageously, in the closed position, the cover element may contact the body of the motor vehicle with its rear side. At the rear of the cover element, at least one gasket is possible that contacts the vehicle body in the closed position of the cover element. This makes it possible to effectively protect the camera unit as well as the drive with its mechanism from moisture, dust, dirt etc. Advantageously, the swivel arm is hinged on a first shaft on the cover element, specifically on the first connection element of the cover element. It is also possible for a second shaft to be provided, around which the cover element, specifically the second connection element of the cover element, is able to swivel while the drive for moving the cover element is activated. In this case, the second shaft travels along the guide contour, with the second connection element traveling along the guide contour, on the one hand, and performing a swiveling movement around the second shaft of the cover element, on the other hand.

According to the invention, the guide contour may have a linear shape and/or, at least in sections, an arc shape. It is expedient if the guide contour with a linear shape forms an angle $\beta$ with the outer body of the motor vehicle to which the device is attached, with the angle $\beta$ being between $1°\leq\beta\leq 45°$, specifically between $10°\leq\beta\leq 35°$. By means of the special design of the angle $\beta$ it is possible to create a compact overall arrangement of the device while simultaneously keeping the swiveling range of the cover element between its closed position and the open position as close as possible to the body of the motor vehicle. The second shaft around which the cover element swivels during its movement may simultaneously move along the linear guide contour. It is of special advantage in one possible embodiment of the invention that the outer surface of the cover element is essentially aligned vertically relative to the body of the motor vehicle in the closed position as well as in the open position. The outer surface of the cover element may have various contours. It is possible, for example, for the outer surface to be aligned essentially parallel to the surface of the vehicle body. It is also possible for the outer surface to have a curved shape. It is a special advantage of the invention that in both positions of the cover element, the user or the person located outside the motor vehicle can always recognize and observe the outer surface of the cover element. This outer surface is commonly used for advertising, information etc.

Another measure for improving the invention may consist of arranging the swivel arm on a first shaft that can be driven by an electric motor, specifically with the swivel arm forming a common component with the first shaft. It is also possible for the swivel arm to be L-shaped. The gearing between the motor and the cover element may be formed by a self-locking worm gear.

It may be of special advantage if an assembly element is provided that has on the rear side several attachment areas on which the camera unit and the drive, specifically the electric motor and the shaft, are arranged. Also, in another possible embodiment of the invention, it is possible for the attachment areas and/or the guide contour to be joined as one piece with the assembly element, specifically with the assembly element forming a joint component with the attachment areas and/or the guide contour.

Preferably, all components on the assembly element are prefabricated, which means that the camera unit, the drive with its mechanism, as well as the cover element are attached to and/or integrated in the assembly element. At the same time, the assembly element comprises at least one attachment means that serves to attach it to the body of the motor vehicle. All the assembly person needs to do is attach the prefabricated assembly element to the vehicle body from the outside. The essential elements of the device according to the invention, such as camera unit, drive with mechanism, and the electrical connections for these are passed through a suitable opening in the body of the motor vehicle, with the attachment means of the assembly element simultaneously ensuring that it is held reliably in position on the outside of the body of the motor vehicle.

It may also be essential for the invention to provide a position detection system that detects at least the closed position and the open position of the cover element, with the electric motor being activated and/or deactivated depending on the closed and/or open position. The position detection system may be controlled mechanically, electronically, and/or by means of software. In one possible embodiment of the invention, the position detection system may comprise at least one transmitter whose position is recognized by a sensor or a switch, with the transmitter specifically arranged on the first shaft. The sensor may consist of a passive or an active sensor. For example, the sensor may be a non-contact or a contact sensor. The sensor may comprise a piezo element or be designed as a Hall sensor. As an alternative, a switch may be provided that is operatively connected with the transmitter. For example, the transmitter may perform, via the movement of the cover element, a position change that is recognized by the switch, or it may contact the switch appropriately. For example, the transmitter may be provided on the first shaft. It is also possible to provide the transmitter on the cover element, specifically on the first and/or on the second connection element.

In a preferred embodiment of the invention, two transmitters may be provided whose position is detected by one sensor or one switch each. The first transmitter serves to inform the position detection system of the open position of the cover element. The second transmitter has the task of informing the position detection system of the closed position. After the sensor or the switch has received the relevant information from the transmitter, the electric motor is deactivated so that the cover element remains at rest in the open position and/or the closed position.

Provisions may also be made for the position detection system to comprise a control unit that controls, with reference to time, the drive for the opening movement and the closing movement of the cover element and/or detects by means of the power consumption of the motor when the open position and the closed position are reached. For example, the control unit can control the opening movement and the closing movement by means of appropriate software, as well as trigger the deactivation of the motor when the open position or the closed position of the cover element are reached. Here, it is possible that the software as well as the control unit detect by means of the power consumption of the motor when the open position and the closed position are reached. The control unit may be integrated in the assembly unit. It is also possible for the control unit to be located outside the assembly unit, for example inside the motor vehicle.

Provisions may also be made for the first shaft to comprise a first gear element that acts on a second gear element of a second shaft, with the second shaft arranged essentially parallel to the first shaft. The parallel arrangement of the first and the second shaft contributes to a compact and space-saving overall arrangement. In addition, the two shafts ensure that power is transmitted reliably from the motor to the cover element. The gear elements referred to above are designed so that a suitable gear ratio is provided inside the drive for the electric motor to exert a suitable force on the cover element so that it reaches its desired position. The arrangement of the gear elements referred to above makes it possible for a simple and cost-efficient electric motor to be used, specifically one with a high speed. By means of using two shafts as well as suitable gear elements that interact with each other, it is possible to create a gear ratio that causes high torque to be generated that acts on the cover element. In an advantageous embodiment, the second shaft comprises a third gear element that interacts with a fourth gear element, specifically a spindle element or a worm element, that is driven by the electric motor. These four gear elements also have the favorable effect of exerting a high torque on the cover element when the electric motor is activated.

In addition, according to the invention, provisions may be made for the attachment areas to be configured to simultaneously serve as support for the first and/or the second shaft. In addition, it may be an essential characteristic of the invention that a cover is arranged on the rear side of the assembly element that essentially covers and/or seals off the components of the drive and of the camera unit. It may offer special advantages if, on its inner surface facing the assembly element, the cover has a contour that serves as support for at least one element of the drive or of the camera unit. At various locations, the inner surface may have contours that serve as support for the essential elements of the drive or of the camera unit. As a consequence, on the one hand, the assembly element may have, in defined areas, support surfaces and, on the other hand, the cover may have on its inner surface contours that serve as support surfaces, so that, when the cover is installed on the assembly element, a reliable attachment and support of the essential components of the drive is effected, specifically of the first and/or the second shaft, the swivel arm, the first and/or the second connection element, the first and the second shaft, the motor as well as its motor shaft, the first, the second, the third, and the fourth gear element, the camera unit, the essential components of the position detection system, in particular its transmitter, its sensor, its switch.

According to a preferred embodiment of the invention, the camera unit is attached immovably on the assembly element. This creates a simple and space-saving overall arrangement. The camera unit may be attached immovably on the assembly element in the closed position as well as in the open position. At the same time, the camera unit is suitably aligned relative to the exterior area of the motor vehicle, specifically at a defined angle relative to the ground.

According to the invention, the invention may also be designed so that the assembly element comprises a first and a second guide contour, in each of which a second connection element is movably supported, with the camera unit and the electric motor arranged between the first and the second guide contour. In addition, two swivel arms may be provided on which the cover element is arranged in a hinged configuration. The swivel arms may be arranged on the first shaft at a distance from each other. Here, the assembly element may comprise recesses in which the swivel arms extend at least partially. These recesses may be components of the rear-side attachment areas of the assembly element. Here, the first and the second guide contours delimit the arrangement of the camera unit and of the electric motor as well as, for the largest part, of the first and the second shaft with their associated gears. The position detection system may also be arranged between the two guide contours. Having guide contours for the cover element provided on two sides has the advantage that a reliable, straight, and uniform movement between the closed position and the open position can be achieved. At the same time, there is sufficient space between the two guide contours to arrange there the essential drive elements as well as the fixed and rigidly immovable camera unit.

In another advantageous embodiment of the invention, in the process for attaching the device according to the invention, the assembly element comprises a lock-type connection on its rear side with which a reliable attachment to the body part can be achieved. Without any effort, the prefabricated assembly element can be locked onto the defined area on the outside of the body part in a simple manner. Of course, alternative attachment methods are also possible, for example a positive and/or frictional and/or material-on-material connection, or the assembly element may be attached to the body parts by means of bolts, for example. Using adhesive for the attachment is also possible.

In addition, the device according to the invention may be equipped with a camera unit that serves to record images of the exterior area of a motor vehicle. In order to protect the camera unit from contamination, a cover element may be provided on the device which can be moved from a closed position to an open position by means of a drive, wherein the camera unit is behind the cover element and inaccessible from outside in the closed position of the cover element, and wherein images can be recorded by the camera unit in the open position of the cover element. Under the terms of this invention, component means, among others, a part of the drive. This may include a motor, a shaft, a gear, a transmission, etc. Even the camera unit and/or the actuation element are components under the terms of this invention. In this device, the camera unit is arranged protected behind the cover element, with the camera unit itself being arranged immovably or rigidly on the device. It is also possible to arrange the camera unit so that it is swivellable by means of a drive, or that it is movable on the device.

It is also possible that, in addition to the camera unit, or optionally, the device comprises an actuation element in the form of a handle or button element which serves to actuate manually or electrically a lock for a movable part such as a lid, a door, etc. Expediently, this actuation element may also be provided behind the cover element for a camera unit. It is also possible for the device to comprise only the actuation element without a camera unit, in which case the actuation element will always be arranged behind a movable cover element that can be actuated by a drive.

Also, the device may optionally be equipped with a proximity sensor, to be arranged specifically in or on the cover element. This proximity sensor makes it possible to control the cover element when, for example, the proximity sensor senses an object in its proximity. This makes it possible to move the cover element from its closed position to its open position. This may be advisable, for example, if a pedestrian approaches closer than the minimum distance from the device according to the invention, with the proximity sensor detecting an associated signal, thereby triggering the recording of images by means of the camera unit. The proximity sensor may use this signal also for lifting the cover element, for example, so that the actuation element becomes accessible for an operator of the vehicle. In this case, a camera unit may optionally be installed behind the cover element, but is not mandatory.

It is also possible to provide an opening in the assembly element through which the camera is able to record images, or through which the actuation element can be reached, with said opening being closed by the cover element in closed position. For an interior space of the device located behind the cover element to be protected from contamination, a gasket may be provided between the cover element and the device, specifically the assembly element. This gasket may consist of an elastic material, in particular rubber or silicon, or may be formed by a labyrinth seal.

In the device according to the invention, it is also possible that at least one component resting in the housing is formed by a motor, a camera unit, and/or a control unit, with the support of the resting components comprising a receptacle, on the one hand, and a securing element, on the other hand. Expediently, the receptacle forming a support for the resting component is arranged in the assembly element so that the resting component only needs to be placed into this associated receptacle. However, in order to fix or hold the resting component immovably in this receptacle, at least one securing element as referred to above may be provided, to be provided on the cover. The securing element itself may be designed with spring action or to be resilient in order to accommodate dimensional tolerances. Of course, it is also possible to hold a resting component in its receptacle by means of several securing elements. Expediently, the contour of the receptacle matches the contour of the resting component so that it can be arranged positively in the receptacle. In addition, a fixing element may be provided in order to fix the component in position in its associated receptacle. This fixing element may consist of a lock-type element. By means of this additional fixing element, it is possible to ensure that the component in question does not fall out of its receptacle in the assembly element if this element is turned over or tilted before the cover is attached.

In the device according to the invention, it is optionally possible that at least one movable component is formed by a rotatable shaft that represents a component of the drive, specifically a gear of the drive, with the component held in the housing by the support on one side only, or on several sides. For example, it is possible to hold the movable component in the housing only by means of a left-side or a right-side support. The support that is usually provided on the other side may be formed by another movable component. For example, a shaft with a gear wheel may have one support in the shaft section, and may receive a second support in that an additional gear wheel interacts mechanically with the gear wheel on the shaft. As a consequence, in conventional terms, only a one-sided support of the component in question (e.g. shaft with gear wheel) is provided.

In addition, in the device according to the invention, it is optionally possible that at least one support of a movable component is formed by two support halves, wherein, in an attachment area, a first support half is provided on the rear side of the assembly element, i.e. on the side facing away from the cover element, and/or wherein a second support half is provided on the inner surface of the cover, i.e. the side of the cover that faces the assembly element. Regarding the support of the movable component, it is also possible to provide, on the assembly element, a fixing element for the movable component. Joining the assembly element and the cover, which is accomplished expediently by placing the cover on the assembly element, will then create the complete support of the movable component.

The first and the second support half of a support for a movable component may be of semi-circular or semi-cylindrical shape in order to optimally support a shaft (representing the movable component) rotatably. The movable component will then be held positively but rotatably in the support. In order to avoid axial shifting of the movable component in the support, at least one side of the support is closed so that the overall support is made (semi-) cylindrical by the first and the second support half. Expediently, the side opposite the closed side will then be designed open which allows the shaft to protrude from the support unilaterally. It is also possible for the support to have open sides on the left and on the right side; however, the movable component in form of a shaft does not receive axial support in this case. Of course, it is also possible for both sides of the support to be closed so that the associated movable component will be held axially in the support on the left as well as on the right side.

The first and the second support half may mirror each other and comprise a free space in order to provide sufficient space for the component during movement. For example, this free space may be required if the component consists of a shaft with a gear wheel or a swivel arm or a similar item. In addition, the first and the second support halves may have the form of ribs, where the protruding ribs form the concrete support locations for the component. This makes an especially material-saving design of the device possible.

Furthermore, the device according to the invention may optionally provide for one or all components to be placed loosely into the associated support in the assembly element so that they will be held in a fixed location in the housing only after the cover is placed on top.

It is also possible in the device according to the invention, that at least one support on the assembly element protrudes bridge-like from the rear side that is specifically of a flat design, simultaneously forming a guide contour for the movable cover element. The bridge-like support on the assembly element is thereby able to perform two functions in that, on the one hand it supports an associated component, for example a shaft, rotatably in the housing while, on the other hand it provides a guide contour for the movable cover element. This makes it possible to obtain an especially compact device with a movable cover element.

Expediently, the device according to the invention may provide for the cover, on its inner surface facing the assembly element, to comprise a contour that serves as a support for at least one element of the drive or of the camera unit. By means of a suitable design of the contour that is geometrically coordinated with the support of the components, the components are held fixed in position in the housing. It is also possible for the securing elements that are referred to above and which may protrude in pin-like fashion, for example, to be present on the inner surface of the cover in order to fix the components in place in their receptacles in the assembly element.

In order to attach the cover to the assembly element, at least one holding element may be provided. This holding element may be pin-shaped. It is possible to arrange the pin-shaped holding element on the assembly element and for it to act positively with a corresponding passage in the cover in order to securely attach the cover to the assembly element. It is also possible for the holding element to consist of a clip or a locking element for securely connecting the cover and the assembly element with each other. Here, the holding element may also be designed to render the connection of cover and assembly element permanent or non-permanent. As a consequence, the holding element may be designed as a suitably shaped locking element.

In order to achieve a good seal of the device according to the invention, the cover may be designed as a shell with a surrounding rim on the inner surface, having specifically at least one passage for electrical plugs or a power cord that serves for the power supply of the device according to the invention. The surrounding rim of the cover referred to above may interact with a flat area of the assembly element or with a rim of complementary design of the assembly element. The rim on the assembly element may overlap the surrounding rim of the cover or may be arranged inside the same, thereby making a simple labyrinth seal achievable. Additionally, between the surrounding rim and the assembly element, a gasket may be provided which makes it possible to achieve a watertight closure of the housing consisting of the cover and the assembly element. The gasket may be provided between the two elements independent of the design of the cover and the assembly element. An especially simple design can be achieved by making the assembly element flat in the sealing area and having it interact with the surrounding rim of the cover. The passages referred to above for a plug or an electric line may also be equipped with a gasket. Also, the plug itself may serve as a seal for the passage.

It is also possible for the cover element, the assembly element, and/or the cover to consist of one molded part, specifically an injection-molded part. Thereby, the assembly element and/or the cover may be engineered as one piece. Plastic or light metal, specifically aluminum, can be used as material for the cover element, the assembly element, and/or the cover. It is also possible to make the elements referred to above of stainless steel or brass.

Additional advantages, characteristics, and details of the invention are given in the following description that describes an embodiment of the invention in detail with reference to the figures. The characteristics referred to in the claims and in the description may be essential for the invention either individually and by themselves or in any combination thereof.

Figure 1:
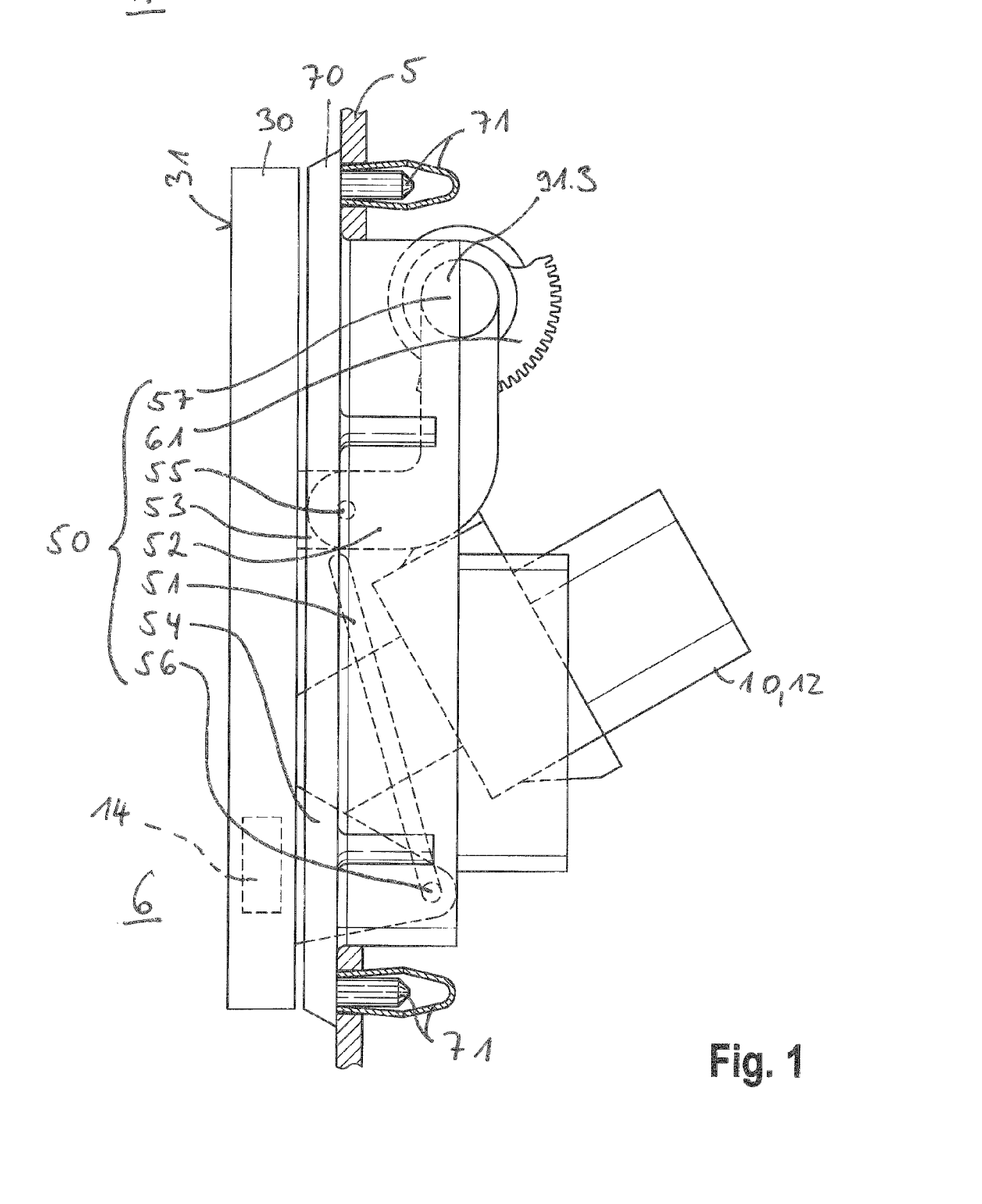
FIG. 1 shows the device having a camera unit according to the invention, where a cover element is provided that is in its closed position and therefore covers the camera unit.

FIG. 1 shows a device having a camera unit 10 according to the invention that is attached to a motor vehicle. The attachment is located in or at the rear end area on a body part 5 of the motor vehicle. The camera unit 10 serves to record images of the exterior area 6 of the motor vehicle, especially while the motor vehicle owner is parking the vehicle. A cover element 30 is provided that can be moved by means of a drive 50 from a closed position 1, shown in FIG. 1, to an open position 2, shown in FIG. 3. In the closed position 1 of the cover element 30, the camera unit 10 is located, inaccessible from the outside, behind the cover element 30. The cover element 30 completely closes off the camera unit 10 so that a recording of images is not possible. When, by means of the drive 50, the cover element 30 is moved to the open position 2, a corresponding swiveling movement of the cover element 30 results, with FIG. 2 showing an intermediate position of the cover element 30.

With the cover element 30 in open position 2, the recording of images of the exterior area 6 of the motor vehicle can be performed. As can be seen from FIG. 1 to FIG. 3, the cover element 30 has an outer surface 31 that an observer from the exterior area 6 is able to see. The exterior surface 31 may serve as a carrier of information. For example, the brand logo of the motor vehicle, a symbol, or lettering may be applied to the exterior surface 31. The exterior surface 31 may have different geometric shapes. In this embodiment according to FIG. 1 to FIG. 3, the exterior surface 31 is shaped with straight lines. Of course, in an embodiment not shown explicitly, the exterior surface 31 may have a different geometric shape; specifically, the exterior surface 31 may be curved in relation to the exterior area 6, having in particular a convex and/or concave shape.

Figure 2:
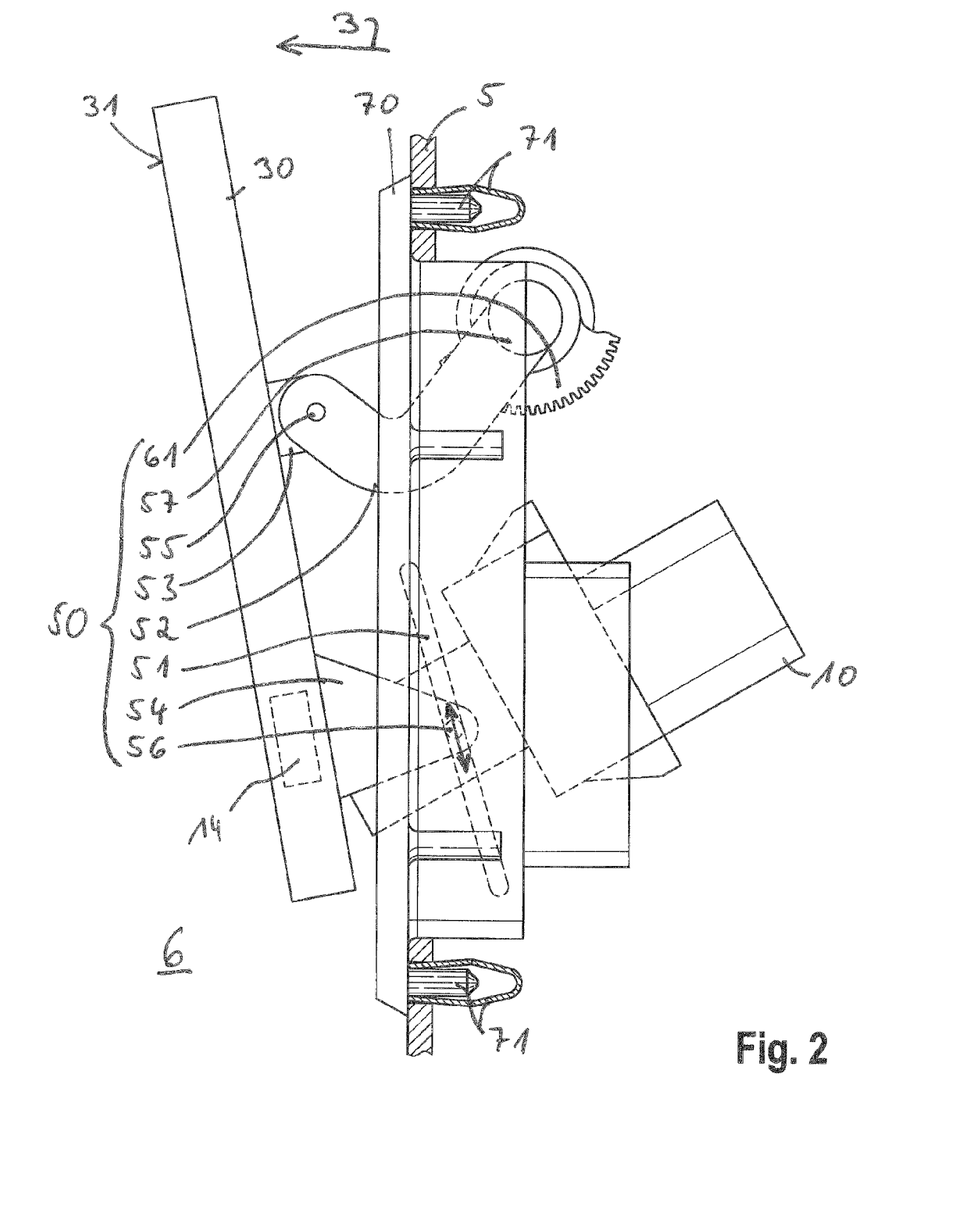
FIG. 2 shows the device according to FIG. 1 where the cover element is moved from the closed position to the open position.
Figure 3:
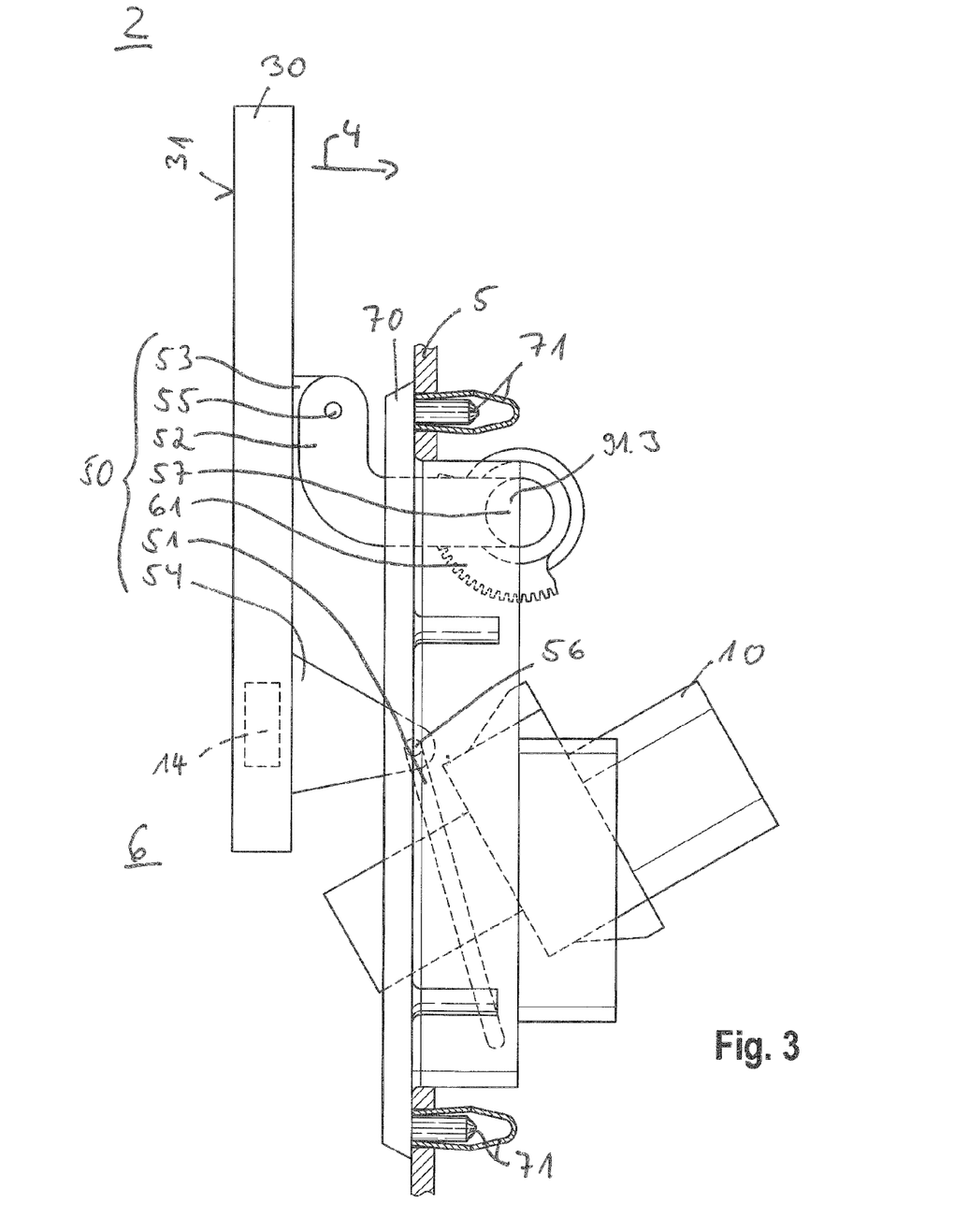
FIG. 3 shows the device according to FIG. 1 where the open position of the cover element is reached.

As is shown in FIG. 1 to FIG. 3, the drive comprises a special mechanism that ensures that during the movement of the cover element 30 between the closed position 1 and the open position 2 the exterior surface 31 is always in the exterior area 6 of the motor vehicle in any position of the cover element 30. At the same time, this special mechanism for moving the cover element 30 means that, in any position of the cover element 30, the exterior surface 31 is always visible to a person located in the exterior area 6 of the motor vehicle.

Figure 4:
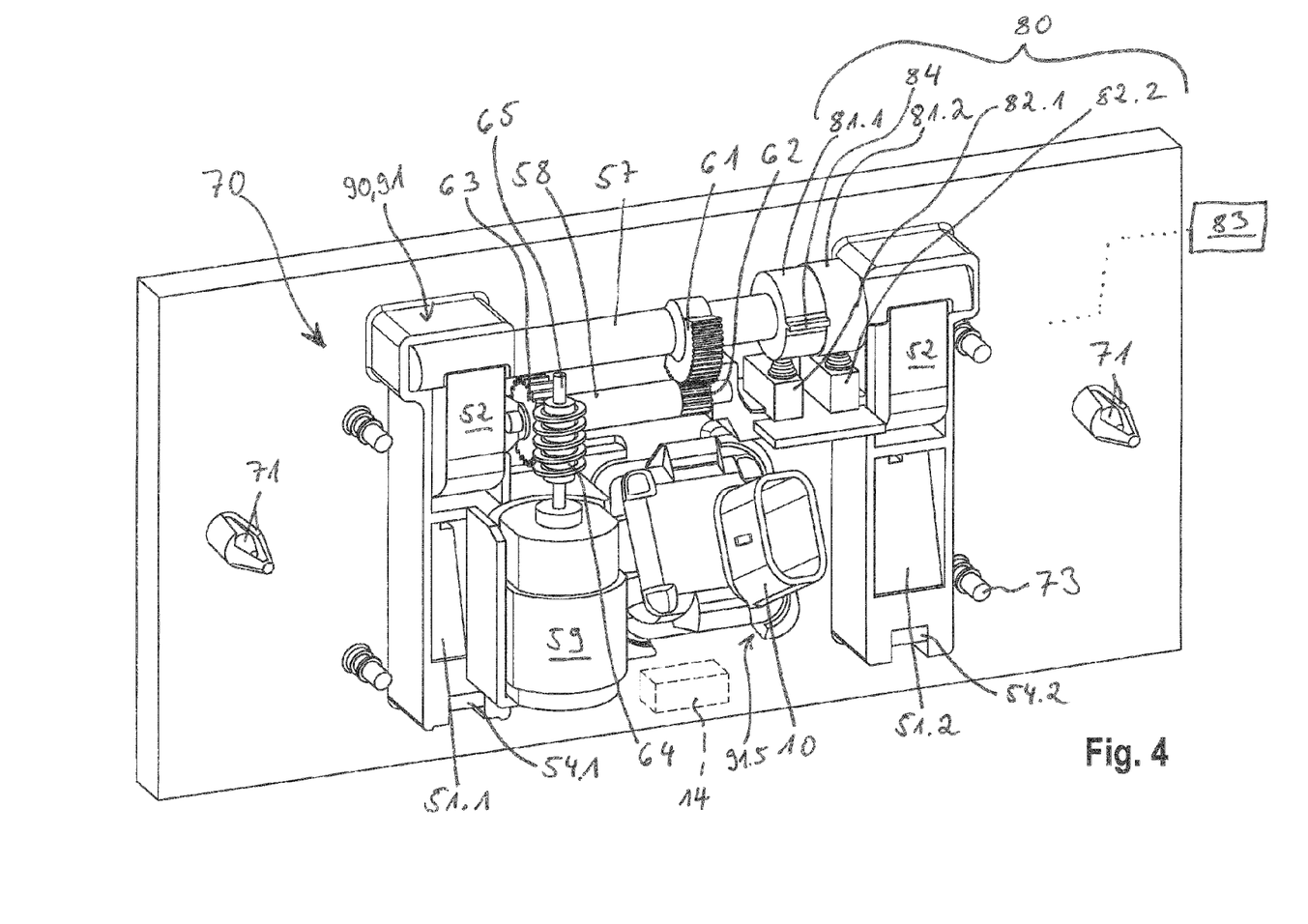
FIG. 4 shows a rear view of the device according to FIG. 1.

It can also be seen that the mechanism for moving the cover element 30 requires a guide contour 51 as well as a swivel arm 52. In this particular embodiment, two guide contours 51.1, 51.2 are provided that can be seen in FIG. 4 and FIG. 6 on the rear side. Also, two swivel arms 52 are provided in the drive 50, with both swivel arms 52 arranged at a distance from each other, as shown in FIG. 4. In addition, on its rear side, the cover element 30 comprises two first connection elements 53 and two second connection elements 54. The first connection element 53 is connected with a swivel arm 52, hinged around the axis 55. The second connection element 54 is supported on the guide contour 51. In this embodiment, the guide contour 51.1, 51.2 extends linearly. When the drive 50 is activated, the cover element 30 swivels around the first axis 55 while the cover element 30 simultaneously travels along the guide contour 51.1, 51.2 on its second connection element 54. While the cover element 30 is sliding along the guide contour 51.1, 51.2, a simultaneous rotary movement takes place around the second axis 56 that also shifts simultaneously in translatory manner along the guide contour 51.1, 51.2.

As can be seen in FIG. 1 to FIG. 3, the mechanism is designed so that during the movement of the cover element 30 from the closed position 1 to the open position 2 in a first movement phase 3 that is shown in FIG. 2, the cover element 30 moves away from the motor vehicle or the body 5. Simultaneously, the cover element 30 swivels around the first axis 55 as well as around the second axis 56, with the axis 56 moving along the guide contour 51.1, 51.2 at the same time. In a second movement phase 4, the cover element 30 is pulled towards the motor vehicle, with the cover element 30 simultaneously swiveling back around both axes 55, 56.

The linear guide contour 51.1, 51.2 forms an angle β with the outer body 5 of the motor vehicle. This angle β is an acute angle which has the effect of permitting a compact design of the device according to the invention while also placing the swivel range as well as the swiveling movement of the cover element 30 as close as possible to the motor vehicle body 5. As FIGS. 1 to 3 show, the exterior surface 31 of the cover element 30 is aligned essentially vertically in relation to the motor vehicle body 5 in the closed position 1 as well as in the open position 2. This increases the visibility of the exterior surface 31 for a person in the exterior area 6. At the same time, this makes it possible to place the cover element 30 as close as possible to the body 5 of the motor vehicle in any position 1, 2. In the open position 2, the cover element 30 is located above the camera unit 10 that is therefore able to reliably record images of the exterior area 6. In this embodiment, the camera unit 10 is inclined towards the surface on which the motor vehicle stands.

FIGS. 1 to 4 also show that each swivel arm 52 is arranged on a first shaft 57 that is driven by an electric motor 59. In addition, a second shaft 58 is provided that extends parallel to the first shaft 57. The first shaft 57 comprises a first gear element 61 that acts on a second gear element 62 of the second shaft 58. In addition, the second shaft 58 comprises a third gear element 63 that interacts with a fourth gear element 64. The fourth gear element 64 is a component of a third shaft 65, specifically the motor shaft of the electric motor 59. In this embodiment, the fourth gear element 64 is configured as spindle element or as worm gear. This special configuration of the drive, specifically the first shaft 57, the second shaft 58, the gear elements 61, 62, 63, 64, and the third shaft 65 advantageously serves for exerting a high torque by means of the electric motor 59 on the cover element 30 during its movement in either the position 1 or 2. Of course, the drive 50 may also be configured differently, i.e. specifically comprise only one shaft with an electric motor that ensures the required movement of the cover element 30.

In this embodiment, the swivel arms 52 are connected as one piece with the first shaft 57, which means that the swivel arms 52 form a single component with the first shaft 57. Also, the first gear element 61 that is located between the two swivel arms 52 is connected as one piece with the first shaft 57. The first gear element 61 has a special design where the gear element extends around the axis of rotation of the first shaft 57, with the gear element 61 with its individual teeth extending only for a quarter circle around the axis of the first shaft 57. The second gear element 62 is also connected with the second shaft 58 as one piece. Here, the second shaft 58 has a smaller diameter than the first shaft 57. At a distance from the second gear element 62, the third gear element 63 is also placed on the second shaft 58.

As all Figures show, an assembly element 70 is provided on which all elements are carried, such as the camera unit 10, the drive 50, including the first shaft 57, the second shaft 58, the electric motor 59, and the cover element 30. This is shown especially clearly in FIG. 4 that shows the rear side of the assembly element 70, with the assembly element 70 comprising several attachment areas 90 on which the elements referred to above that are carried by the assembly element 70 are attached and/or supported. This makes it possible to prefabricate the assembly element with the essential elements, specifically the camera unit, the components of the drive, and the cover element 30. In addition, on its rear side, the assembly element 70 comprises two attachment means 71 that serve to attach the assembly element 70 in a simple way to the outside of the body part 5 of the motor vehicle. As a consequence, the device according to the invention may be present in the form of a pre-assembled assembly element that requires only a single process step for its attachment to the outside of the body 5 of the motor vehicle 5. Here, the body 5 comprises suitable corresponding attachment means that interact with the attachment means 71. For example, the attachment of the assembly element 70 to the body 5 can be achieved by a bolted connection, a locking connection, etc.

The attachment areas 90 referred to above simultaneously serve as support of the first shaft 57, the second shaft 58, the third shaft 65. It is a special feature of the invention that the attachment areas 90 as well as the guide contours 51.1, 51.2 are joined as one piece with the assembly element 70. The assembly element 70 may be an injection-molded part made of plastic, for example.

As FIG. 4 clearly shows, the device according to the invention comprises a position detection system 80 that detects the closed position 1 and the open position 2 of the cover element 30. For this purpose, the position detection system 80 comprises a first transmitter 81.1 and a second transmitter 81.2. Both transmitters 81.1, 81.2 are arranged on the first shaft 57 and each comprise a cam 84 that protrudes like a projection. The transmitter 81.1, 81.2 and their cams 84 each interact with a switch 82.1, 82.2. The first transmitter 81.1 is responsible for detecting the closed position 1. The transmitter 81.2, on the other hand, is responsible for detecting the open position 2. This works as follows: when the rotating cam 84 of the transmitter 81.1 activates the switch 82, specifically actuates it mechanically, this event is reported to a control unit 83 which, in turn, deactivates the drive 50, specifically the electric motor 59. When the rotating cam 84 of the second transmitter 81.2 switches the associated switch 82.2, this is reported to the control unit 83, or the control unit 83 detects this switch condition which, in turn, performs a deactivation of the drive 50, specifically a deactivation of the electric motor 59 which causes the open position 2 of the cover element 30 to be detected.

For example, the control unit 83 may be located outside the device according to the invention, e.g. inside the motor vehicle, as shown schematically in FIG. 4. As an alternative, the control unit 83 may be located below the switches 82.1, 82.2 that is located on suitable attachment areas 90 of the assembly element 70.

As an alternative, the position detection system 80 may be configured with a control unit 83 that controls, with reference to time, the drive 50 for the opening movement and the closing movement of the cover element 30, and detects from the power consumption of the motor 59, for example, when the open position 2 and the closed position 1 is reached. Preferably, suitable software for performing such a power consumption detection is integrated in the control unit 83.

FIGS. 1 to 4 show by a dotted line the arrangement of an optional proximity sensor 14. This sensor may be arranged in or on the cover element 30 or on the assembly element 70. In addition, the camera unit 10 may be replaced or augmented by an actuation element 12.

Figure 5:
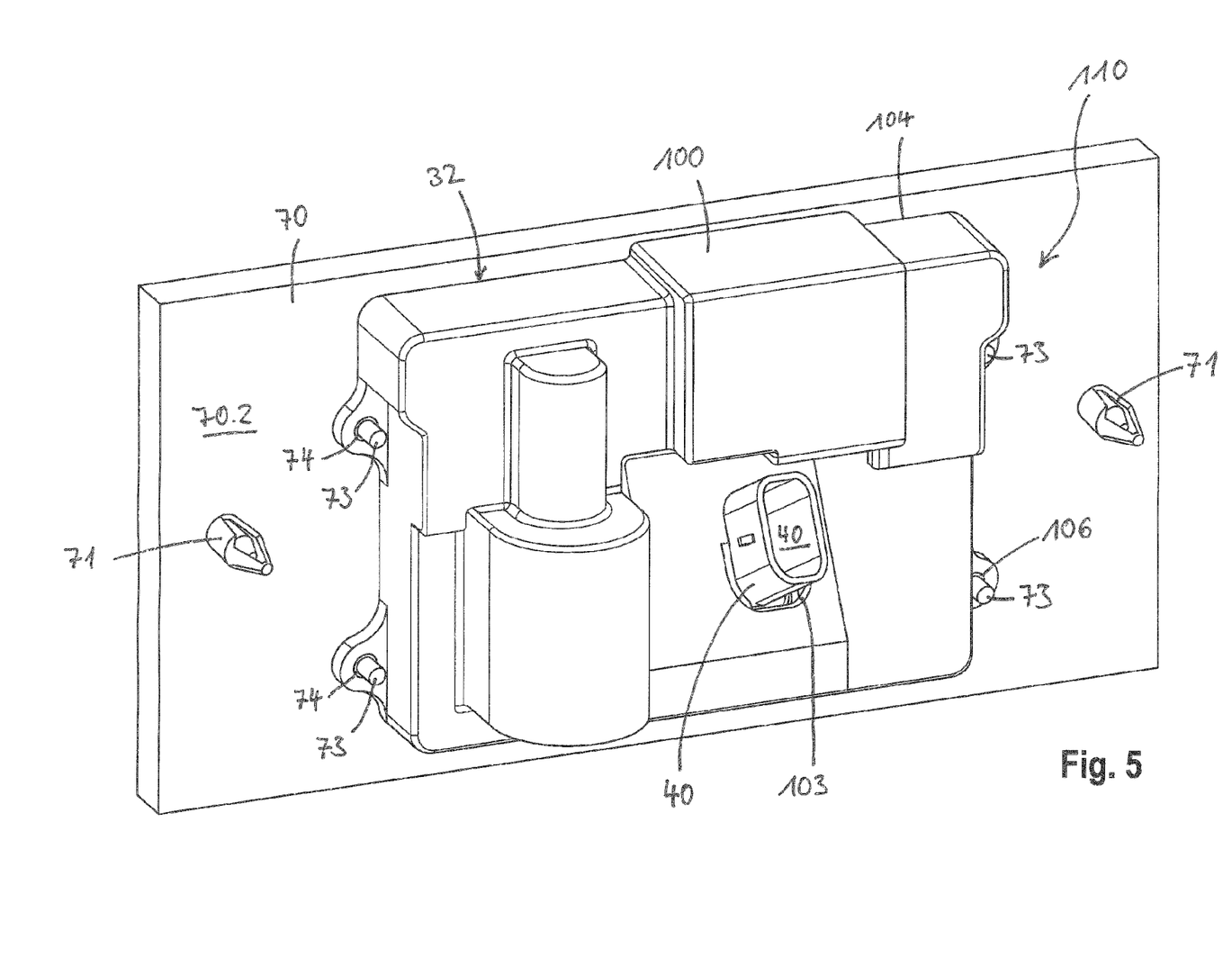
FIG. 5 shows another rear view of the device according to FIG. 1.

FIG. 5 shows the device according to the invention from the rear side 70.2 of the assembly element 70. Here, the cover 100 is joined with the assembly element 70 and forms the housing 110. In order to attach the cover 100 securely to the assembly element 70, pin-type holding elements 73 are arranged on the assembly element 70 that protrude from the rear side 70.2. The cover 100, on the other hand, is equipped with passages 106 for the holding elements 73 in order to guide the cover 100 over the holding elements 73. To prevent the cover 100 from detaching from the holding elements, locking rings 74 are provided that interact positively and/or frictionally with the holding elements 73, holding the cover 100 in its assembled position on the assembly element. In order to seal the housing towards the rear side 70.2, a gasket 32 is provided between the assembly element 70 and the cover 100. Expediently, this gasket 32 rests on a continuous rim 104 of the cover 100 and interacts with the rear side 70.2 of the assembly element 70. The rear side 70.2 is flat in the area of the continuous rim so that a good sealing effect can be achieved.

FIG. 5 also shows that the cover 100 comprises a passage 103 for a plug 40 so that the device can be connected by means of an electric cord. For the passage 103, a gasket may also be provided to seal the cover 100 at this location. However, it is also possible that the plug that is supplied from the outside and interacts with the plug 40 seals the passage 103. In that case, an additional gasket at this location is not necessary.

The entire cover 100 can also be firmly connected with the assembly element 70 by means of thread-shaped holding elements 73 or clip-shaped holding elements 73 or clips or lock-type holding elements 73. In FIG. 5, a total of 4 holding elements 73 are used that are arranged at the edge on the vertical side edges of the cover 100.

FIG. 5 also shows that the entire device can be attached to the body 5 of the motor vehicle by means of the attachment means 71. Said attachment means 71 are configured like expanding plugs and interact with an associated hole in the body. After inserting the attachment means 71 through the holes in the vehicle body 5, a pin is pushed into the attachment means 71 which causes the attachment means 71 to expand and to hold the entire device positively and/or frictionally on the vehicle body 5. Here, the installation of the device may be performed exclusively from the exterior area 6 of the vehicle 6.

Figure 6:
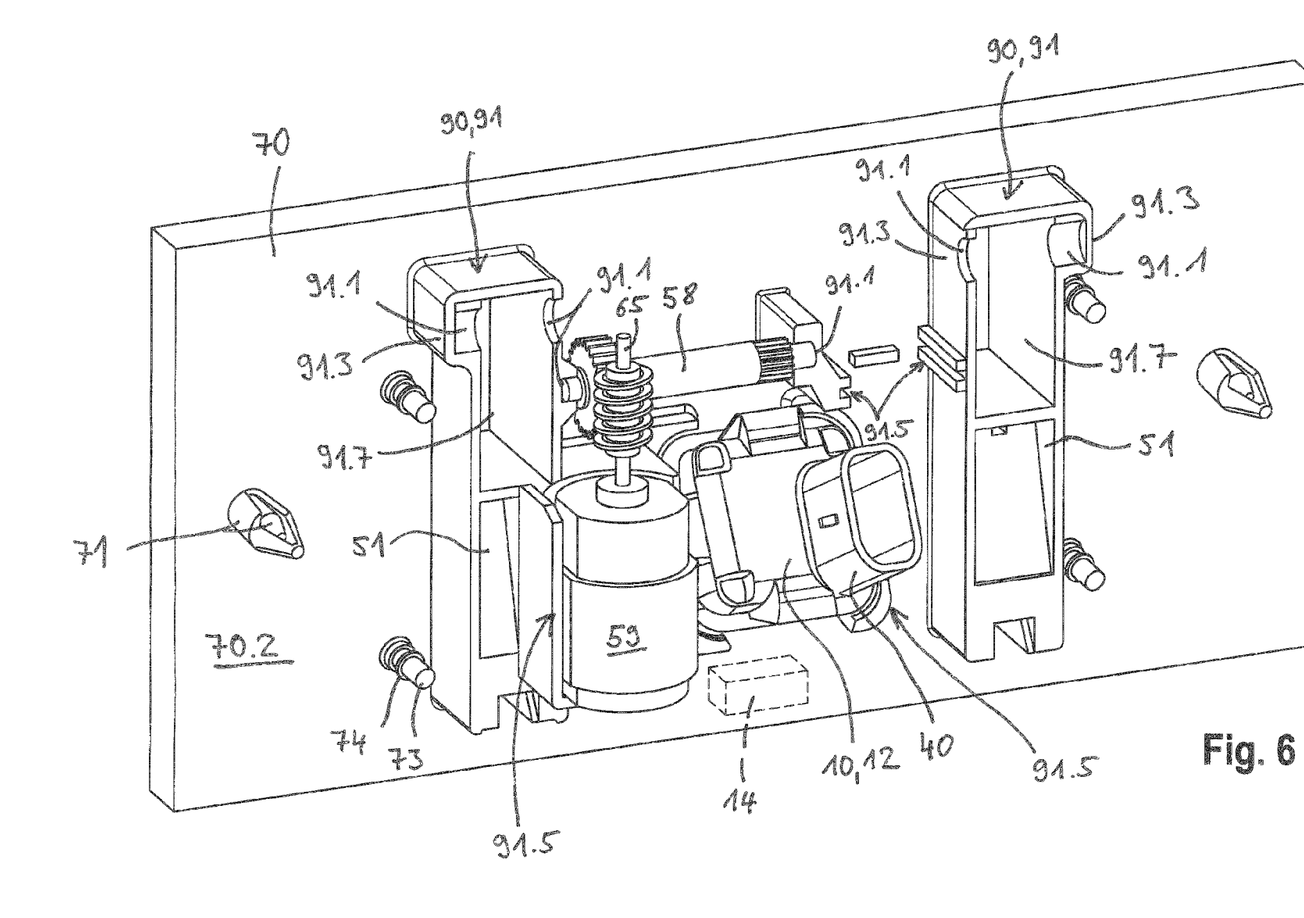
FIG. 6 shows another rear view of the device according to FIG. 1.

FIG. 6 shows the device from the rear side 70.2 of the assembly element 70, with the cover 100 removed. For a better illustration, the first shaft 57 was also removed from its supports 91 so that a detailed view of the relevant attachment area 90 and of the support 91 can be shown. However, the second shaft 58 is arranged in its comparable support 91 in the assembly element 71. The first shaft 57, the second shaft 58, and the motor shaft 65 represent movable components in terms of the device according to the invention that are arranged in a fixed location in the housing 110 by the support 91. The motor 59 as well as the camera unit 10 or the actuation element 12 are arranged on the assembly element 70 as immovable parts. In FIG. 6, the control unit 83 has also been removed in order to be able to give a detail view of the support 91 for the immovable control unit 83. Also, a proximity sensor 14 is optionally arranged on the rear side 70.2 of the assembly element that can be attached by means of a support 91 to the assembly element 70, comparable with the position detection system 80. The comparable proximity sensor 14 is arranged optionally in the cover element 30 in the FIGS. 1 to 4 and is therefore indicated by a dotted line only.

Below, the support 91 for a movable component 57, 58, 65 is described in detail. The first shaft 57 is partially supported on the left and the right by means of the supports 91 in the attachment areas 90 on the assembly element 70. For this purpose, first support halves 91.1 having a semi-circular cross-section are molded into the assembly element 70.

Figure 7:
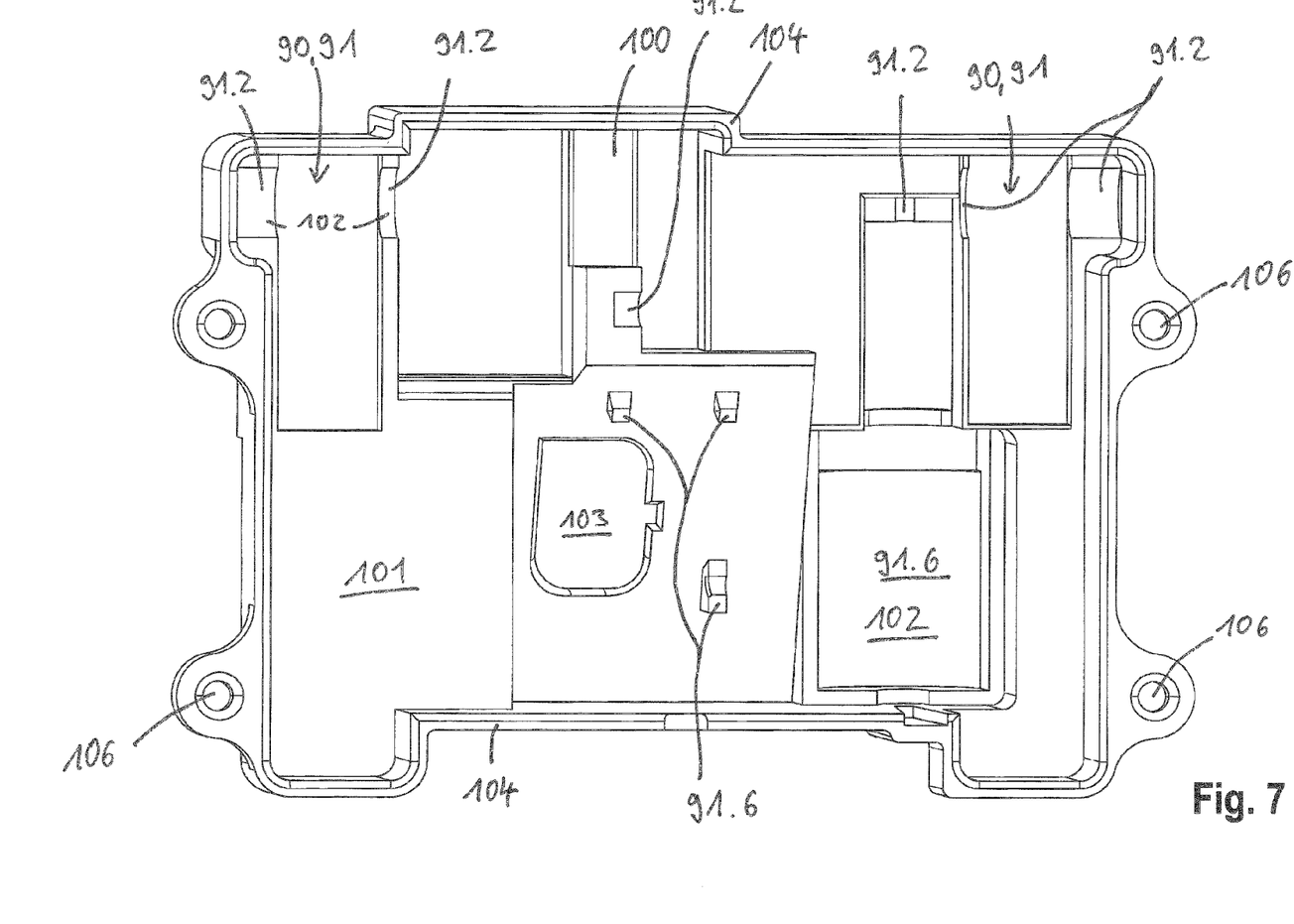
FIG. 7 shows another view of the cover shown in FIG. 5.

For the first shaft 57 to be held axially in the support 91, the outer sides 91.3 of the support halves 91.1 are continuous. By contrast, the inner sides 91.3 of the first support half 91.1 are open in order to make it possible to pass the first shaft 57 through on these sides. The first support halves 91.1. of the shaft 57 comprise a free space 71.7 that serves to make it possible to pass through the swivel arm 52 that is attached to the shaft 57. As a consequence, the first support halves 91.1 are arranged on the rear side 70.2 of the assembly element 70 in the form of ribs. The first shaft 57 is placed only into the first support halves 91.1 and is supported movably in the housing 110 by the second support halves 91.2 that are arranged in the cover 100. This only requires the cover 100 to be placed on the assembly element 70. FIG. 7 shows in detail the second support halves 91.2 that are shaped to be essentially geometrically complementary to the first support halves 91.1 in the assembly element 70. The first support halves 91.1 and the second support halves 91.2 are positioned directly opposite from each other in order to be able to securely support the associated components when the housing 110 is closed.

FIG. 6 also shows that the second shaft 58 is also arranged movably by means of suitable first support halves 91.1 on the assembly element 70. For this purpose, the first support halves 91.1 are shaped semi-cylindrically in order to accept rotatably the round shaft ends of the second shaft 58. In the support 91 for the second shaft 58, the outer sides 91.3 are also closed in order to hold the shaft axially in the housing 110.

The immovable components, such as the motor 59 and the camera unit 10 or the actuation element 12 or the position detection system 80, are held on the assembly element 70 by means of the supports 91. For this purpose, suitable receptacles 91.5 are arranged on the assembly element 70 that essentially match the outer contours of the immovable components. The support 91 for the position detection system 80 is formed by a linear guide that also serves as the receptacle 91.5. As a consequence, the position detection system 80 is simply pushed into the elongated receptacle 91.5. The motor 59 is also placed in its receptacle 91.5 that has a complementary geometry, and the camera unit 10 or the actuation element 12 are also placed in the receptacle 91.5 of complementary geometry in the assembly element 70. In order to also hold the immovable components fixed in their locations in the housing 110, suitable securing elements 91.6 are arranged on the cover 100 that ensure that the immovable components are pushed into their receptacle 91.5 when the cover 100 is installed on the assembly element 70.

FIG. 7 shows only the cover 100 in a view of its inner surface 101. It clearly shows the contours 102 for attaching the movable and immovable components that are formed by the second support halves 91.2 and the securing elements 91.6. The cover 100 is essentially box-shaped and comprises a continuous rim 104 that protrudes from the inner surface 101. The inner surface 101 is designed not flat but contour-rich in order to thereby hold the components of the device fixed in their locations in the housing 110. In the upper left and right attachment area 90 of the device (in the view of FIG. 7), the second support halves 91.2 for the first shaft 57 can be seen clearly; these interact in a complementary manner with the first support halves 91.1 of the assembly element 70, forming the total support 91 for the shaft 57. Above the passage 103, the second support half 91.2 for the second shaft 58 can be seen that is created in a semi-cylindrical shape in the inner surface 101 of the cover 100. The second shaft 58 (in the view of FIG. 7) is only supported on the left side in the housing 110. The support of the second shaft 58 on its right side is achieved by means of the fourth gear element 64 that is arranged on the motor shaft 65 of the motor 59 (see also FIG. 8). The motor shaft 65 is also supported by a second support half 91.2 in the cover 100. This support half 91.2 is also created in a semi-cylindrical shape in the cover 100. As an immovable part, the motor 59 itself is supported immovably in the support 91 by the contour 102 and the securing element 91.6 that is of complementary design. The camera unit 10 or the actuation element 12 is pushed into the receptacle 91.5 of the assembly element 70 by the three securing elements 91.6 that are arranged in the shape of cams or bridges above or on the right side of the passage 103 on the inner surface 101 on the cover 100. These securing elements 91.6 may be designed with spring action in order to press the camera unit 10 or the actuation element 12 into the receptacle 91.5. The cover 100 as well as the assembly element 70 may be designed as one piece, and produced as a cast or injection-molded part.

Figure 8:
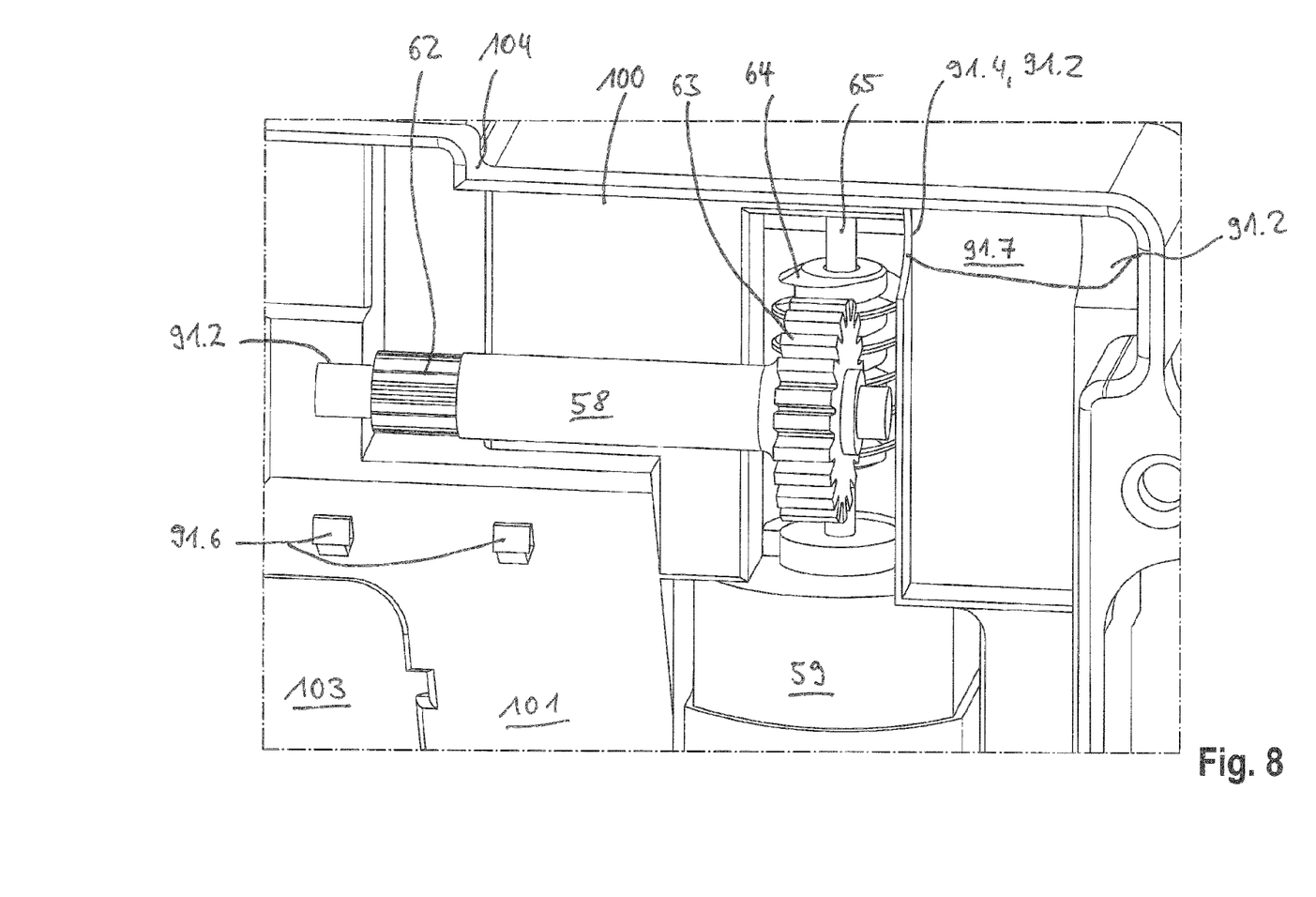
FIG. 8 shows another detail view of the cover that holds and supports components of the drive, specifically the electric motor and various shafts.

For the sake of clarification, FIG. 8 shows the second shaft 58 drawn in the cover 100 that interacts mechanically with the motor 59 that is also shown. As can be seen clearly, the second shaft 58 is supported only on the left side (in the view of FIG. 8) in the cover 100 by the second support half 91.2 or by the support 91. On the right side, the second shaft 58 is not supported. However, the motor shaft 65 that extends transversely to the second shaft 58 assumes this support function because the third gear element 63 on the second shaft 58 interacts with the fourth gear element 64 on the motor shaft 65. The gearing between the second shaft 58 and the motor shaft 65 forms a self-locking worm gear. This self-locking feature makes it possible for the cover element 30 to be held automatically in the closed position 1 or the open position 2 or in any position in between, and it can only be moved out of these positions by a rotation of the motor shaft 65. This means that the motor 59 can be switched off in the closed position 1 or the open position 2, but the cover element 30 will still remain in these positions. The upper end of the motor shaft 65 that extends beyond the worm gear 64 or the fourth gear element 64 is arranged in the cover 100 in a second support half 91.2 so that this shaft 65 can not be pushed away by the gear wheel 63 of the second shaft 58. The detail enlargement of the cover 100 in FIG. 8 clearly shows the bridge-shaped securing elements 91.6 for the camera unit 10 or the actuation element 12 above the passage 103. In this case, these elements 91.6 are designed with spring action in order to be able to compensate for dimensional or manufacturing tolerances etc. during the assembly of the device. In addition, high mechanical stresses in the device can thereby be avoided during the assembly of the assembly element 70 with the cover 100 and the components arranged in between.

FIG. 8 also clearly shows a section of the continuous rim 104. The second support half 91.2 for the first shaft 57 is located on the upper right in FIG. 8. Here, the second support half 91.2 is separated by the free space 91.7 so that, on the left, the second support half 91.2 is formed by the rib-shaped bar 91.4.

LIST OF REFERENCE NUMBERS

1 Closed position
2 Open position
3 First movement phase
4 Second movement phase
5 Motor vehicle body
6 Exterior area of the motor vehicle
10 Camera unit
12 Actuation element, specifically handle or button element
14 Proximity sensor
30 Cover element
31 Outer surface
32 Gasket
40 Plug/line
50 Drive
51 Guide contour
51.1 First guide contour
51.2 Second guide contour
52 Swivel arm
53 First connection element
53.1 First connection element
53.2 First connection element
54 Second connection element
54.1 Second connection element
54.2 Second connection element
55 First axis
56 Second axis
57 First shaft
58 Second shaft
59 Motor, electric motor
61 First gear element
62 Second gear element
63 Third gear element
64 Fourth gear element
65 Third shaft, motor shaft
70 Assembly element
70.1 Front side
70.2 Rear side
71 Means of attachment
72 Opening
73 Holding element (pin-shaped)
74 Locking ring
80 Position detection system 81 Transmitter
81.1 Transmitter
81.2 Transmitter
82 Sensor, switch
82.1 Sensor, switch
82.2 Sensor, switch
83 Control unit
84 Cam
90 Attachment area
91 Support
91.1 First support half for movable component
91.2 Second support half for movable component
91.3 Side of the support half
91.4 Rib-shaped bar of a support half
91.5 Receptacle for immovable component
91.6 Securing element for immovable component
91.6 Free space
100 Cover
101 Inner surface
102 Contour
103 Passage (for 40)
104 Continuous rim
105 Outer surface
106 Passage (for 73)
110 Housing

The invention claimed is:

1. A device with an assembly element and a cover that together form a housing, specifically for a camera unit and/or an actuation element wherein at least one component, specifically a component of a drive, is arranged inside the housing, wherein the component receives support in the assembly element on the one hand, and in the cover, on the other hand,
   wherein a camera unit that serves for recording images of the exterior area of a motor vehicle and a cover element are present, the cover element being movable by means of the drive from a closed position to an open position, the camera unit is located, inaccessible from the outside, behind the cover element when the cover element is in closed position, and the recording of images can be performed when the cover element is in open position, and the component is a part of the drive,
   wherein at least one support of a movable component is formed by two support halves, wherein, in an attachment area, a first support half is provided on the rear side of the assembly element and/or a second support half is provided on the inner surface of the cover,
   wherein the first support halves having a semi-circular cross-section and are molded into the assembly element.

2. The device according to claim 1, wherein at least one component is supported movably in the support of the assembly element and the cover, with specifically the component being a component of the drive.

3. The device according to claim 1, wherein an opening provided in the assembly element through which the recording of images by the camera unit can be performed, with the opening being closed by the cover element in the closed position.

4. The device according to claim 1, wherein at least one component resting in the housing is formed by a motor, a camera unit, and/or a control unit, with the support of the resting components comprising a receptacle, on the one hand, and a securing element, on the other hand.

5. The device according to claim 1, wherein at least one movable component is formed by a rotatable shaft that represents a component of the drive, specifically a gear of the drive, with the component held in the housing by the support only on one side or on several sides.

6. The device according to claim 1, wherein the first and the second support half are semicircular and specifically comprise an open side.

7. The device according to claim 1, wherein the first and the second support half mirror each other and specifically comprise a free space in order to provide sufficient space for the component during movement.

8. The device according to claim 1, wherein one or all components are placed loosely into the associated supports in the assembly element so that they are held in a fixed location in the housing only after the cover is placed on top.

9. The device according to claim 1, wherein at least one support on the assembly element protrudes bridge-like from the rear side that is specifically of a flat design, simultaneously forming a guide contour for the movable cover element.

10. The device according to claim 1, wherein the cover, on its inner surface facing the assembly element, comprises a contour that serves as a support for at least one element of the drive or of the camera unit.

11. The device according to claim 1, wherein the cover is arranged on the assembly element by means of at least one holding element.

12. The device according to claim 1, wherein the cover may be designed as a shell with a surrounding rim on the inner surface, having specifically at least one passage for an electrical plug or a power cord.

13. The device according to claim 1, wherein at least one gasket that specifically is positioned flat against the assembly element is provided between the cover and the assembly element.

* * * * *

UNITED STATES PATENT AND TRADEMARK OFFICE
CERTIFICATE OF CORRECTION

PATENT NO. : 9,444,984 B2
APPLICATION NO. : 13/845451
DATED : September 13, 2016
INVENTOR(S) : Austen Kolar Scudder et al.

Page 1 of 1

It is certified that error appears in the above-identified patent and that said Letters Patent is hereby corrected as shown below:

On the Title Page

Item [72], Alex Scott Walters, "Bulter" should be replaced with --Butler-- WI

Signed and Sealed this
Twenty-ninth Day of May, 2018

Andrei Iancu
*Director of the United States Patent and Trademark Office*